(12) United States Patent
Kocsis

(10) Patent No.: US 11,904,395 B2
(45) Date of Patent: Feb. 20, 2024

(54) HAND-HELD MACHINE TOOL

(71) Applicant: Robert Bosch GmbH, Stuttgart (DE)

(72) Inventor: Zoltan Kocsis, Miskolc (HU)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 17/442,377

(22) PCT Filed: Mar. 24, 2020

(86) PCT No.: PCT/EP2020/058077
§ 371 (c)(1),
(2) Date: Sep. 23, 2021

(87) PCT Pub. No.: WO2020/193508
PCT Pub. Date: Oct. 1, 2020

(65) Prior Publication Data
US 2022/0176478 A1    Jun. 9, 2022

(30) Foreign Application Priority Data

Mar. 26, 2019    (DE) ...................... 10 2019 204 097.7

(51) Int. Cl.
*B23D 51/20*    (2006.01)
*B23D 51/10*    (2006.01)

(52) U.S. Cl.
CPC ............. *B23D 51/20* (2013.01); *B23D 51/10* (2013.01)

(58) Field of Classification Search
CPC ........ B23D 51/20; B23D 51/10; B23D 51/16; B23D 57/0015; B23D 57/0053;
(Continued)

(56) References Cited

U.S. PATENT DOCUMENTS

| 1,948,109 A | 2/1934 | Hager |
| 2,330,618 A | 9/1943 | Plumb |

(Continued)

FOREIGN PATENT DOCUMENTS

| DE | 37 22 542 A1 | 1/1989 |
| DE | 693 16 413 T2 | 5/1998 |

(Continued)

OTHER PUBLICATIONS

International Search Report corresponding to PCT Application No. PCT/EP2020/058077, dated Jun. 29, 2020 (German and English language document) (6 pages).

*Primary Examiner* — Ghassem Alie
(74) *Attorney, Agent, or Firm* — Maginot, Moore & Beck LLP

(57) ABSTRACT

There is a hand-held machine tool, in particular a saber saw, with a housing, a drive motor with an output shaft, a spindle for receiving a tool, in particular a saw blade, and a motion converter for converting a rotational motion of the drive shaft into a reciprocating motion of the spindle. The motion converter comprises an eccentric element driven by the output shaft rotationally about an axis of rotation with a driver part arranged eccentrically to the axis of rotation, and a pendulum element which is mounted pivotably about a bearing point and is connected via a coupling point to the spindle. The pendulum element has a guide element for guiding the driver part. In one embodiment, the guide element is arranged between the bearing point and coupling point.

14 Claims, 8 Drawing Sheets

(58) Field of Classification Search
CPC .... B23D 49/002; B23D 49/162; B23D 49/10; B25F 5/008; H02K 7/145; H02K 7/075; H02K 21/16; H02K 9/06; H02K 5/20
USPC ....... 30/392, 393, 394, 116, 117; 125/16.01, 125/16.03
See application file for complete search history.

(56) References Cited

U.S. PATENT DOCUMENTS

| | | | |
|---|---|---|---|
| 2,705,980 A | | 4/1955 | Papworth |
| 2,721,586 A | * | 10/1955 | Hill ........................ B23D 49/16 83/786 |
| 2,946,358 A | | 7/1960 | Bruck |
| 3,373,779 A | * | 3/1968 | Taft ...................... B23D 49/162 30/394 |
| 5,077,902 A | | 1/1992 | Hitt |
| 2002/0178589 A1 | * | 12/2002 | Wong ...................... B26B 7/005 30/277.4 |
| 2005/0126018 A1 | * | 6/2005 | Haas ...................... B23D 51/16 30/392 |
| 2011/0265335 A1 | * | 11/2011 | Bantle .................. B23D 49/165 30/394 |
| 2018/0021868 A1 | * | 1/2018 | Adams ................. B23D 49/162 30/394 |
| 2018/0236572 A1 | * | 8/2018 | Ukai ...................... B23D 51/16 |
| 2020/0070265 A1 | * | 3/2020 | Wang ...................... B25D 17/24 |

FOREIGN PATENT DOCUMENTS

| | | |
|---|---|---|
| DE | 10 2010 038 343 A1 | 2/2011 |
| EP | 1 785 212 A2 | 5/2007 |
| EP | 2 842 675 A1 | 3/2015 |

\* cited by examiner

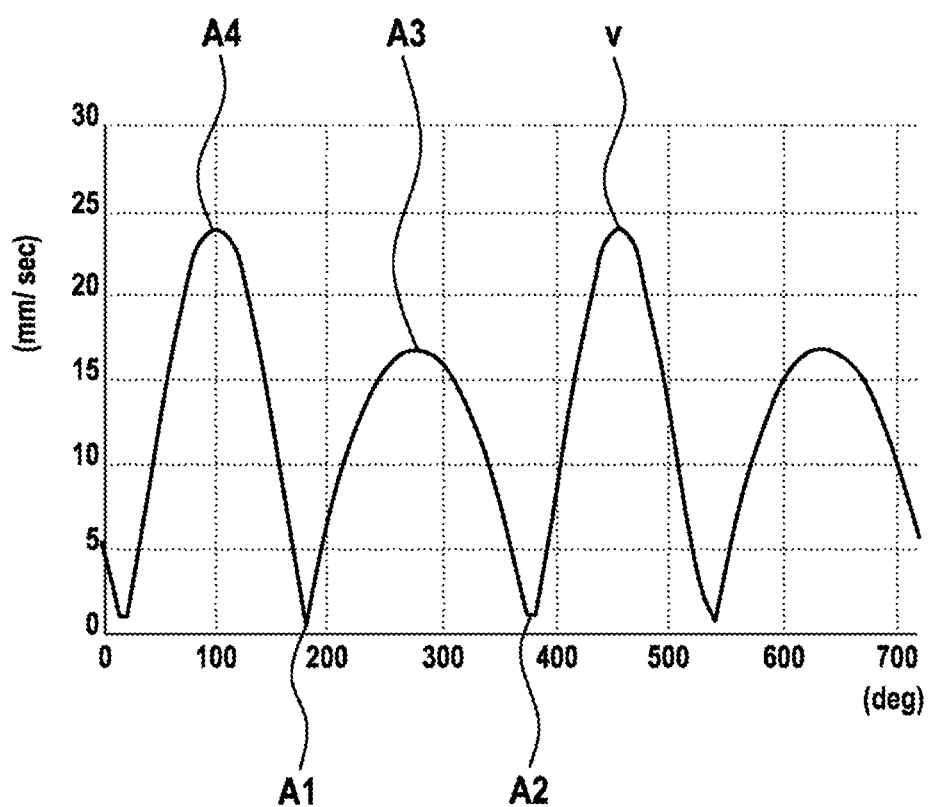

HAND-HELD MACHINE TOOL

This application is a 35 U.S.C. § 371 National Stage Application of PCT/EP2020/058077, filed on Mar. 24, 2020, which claims the benefit of priority to Serial No. DE 10 2019 204 097.7, filed on Mar. 26, 2019 in Germany, the disclosures of which are incorporated herein by reference in their entirety.

The present disclosure relates to a hand-held machine tool, in particular a saber saw and a motion converter for converting a rotational motion of the output shaft of a drive motor.

BACKGROUND

Hand-held machine tools, in particular saber saws of the type described above are generally known and are used, depending on the selection and properties of the saw blade, for cutting various objects which are produced from a plurality of materials such as metal, wood or plaster. As a result of the available wireless, battery-driven designs, such saber saws enable cutting in tight spaces or at unusual angles, as is necessary, for example, when laying heating, ventilation and air-conditioning pipes, or electric lines.

Driving of the saber saws is often performed with a drive motor and with a motion converter for converting the rotational motion of the output shaft of the drive motor into a lifting motion in order to move the saw blade in a reciprocating manner. Various approaches have been developed in principle for this purpose. Known variants of these motion conversion devices comprise, for example, slotted links, a thrust crank gearing, eccentric drives or.

In the case of a typical wobble plate drive, for example, the drive arm of a primary wobble plate possesses a spherical tip which engages into a corresponding bore in the spindle then driven in a reciprocating manner.

An eccentric drive is disclosed, for example, in EP2842675A1. Driving is performed by a drive motor which drives an eccentric via a gearing mechanism. A connecting rod which converts the rotational motion of the drive motor via a second connecting rod into a pushing motion of the connected saw blade runs on this. In order to suppress vibrations, this document furthermore discloses a counterweight device for use in a saber saw with a drive, a lifting rod and at least one first joint rod.

In the case of the hand-held machine tools known from the prior art, in particular in the case of the saber saws, it has been shown to be disadvantageous that, due to the design, they often have an empty weight which is not to be underestimated and as a result of this do not correspond to the concept of simple handling in tight conditions. Moreover, the structure of the motion converter in the prior art has usually been shown to be complicated, not very robust and/or costly.

SUMMARY

The object of the disclosure is to improve the above-mentioned disadvantages and provide a hand-held machine tool, in particular a saber saw and a motion converter for converting a rotational motion of the output shaft of a drive motor, by which the output is increased, and wherein a simple, effective, low-cost and/or energy-efficient conversion of a rotational motion into a lifting motion can be provided.

This object is achieved by a hand-held machine tool according to the disclosure and a motion converter for converting a rotational motion of the output shaft of a drive motor according to the disclosure. Advantageous configurations, variants and further developments of the disclosure can be inferred from the disclosure.

A hand-held machine tool according to the disclosure, in particular a saber saw, has a housing, a drive motor with an output shaft, a spindle for receiving a tool, in particular a saw blade, and a motion converter for converting a rotational motion of the output shaft into a reciprocating motion of the spindle. The motion converter comprises an eccentric element driven by the output shaft rotationally about an axis of rotation with a driver part arranged eccentrically to the axis of rotation, and a pendulum element which is mounted pivotably about a bearing point and is connected via a coupling point to the spindle.

According to the disclosure, it is provided that the pendulum element has a guide element for guiding the driver part. In this case, the guide element is arranged between the bearing point and the coupling point.

In one particularly advantageous embodiment, the bearing point and the coupling point define a first axis of the pendulum element; wherein the guide element allows a motion component, directed along the first axis of the pendulum element, of the driver part relative to the pendulum element and largely prevents a motion component, directed perpendicular to the first axis of the pendulum element, of the driver part relative to the pendulum element.

The pendulum element furthermore has between the first end and the second end a guide element for guiding the driver part. It is provided according to the disclosure that the guide element allows a motion component, directed along the longitudinal axis of the pendulum element, of the driver part relative to the pendulum element and largely prevents a motion component, directed perpendicular to the longitudinal axis of the pendulum element, of the driver part relative to the pendulum element.

The pendulum element has a first end and a second end, wherein the first end is mounted via the bearing point advantageously inside the housing and the second end is connected via the coupling point to the spindle.

In one preferred embodiment, the first end and the second end define a longitudinal axis of the pendulum element.

The spindle is advantageously mounted at least partially in the housing, wherein the rotational motion of the output shaft is converted into a reciprocating motion of the spindle relative to the housing.

In this manner, effective and progressive cutting power of the hand-held machine tool can be achieved, wherein this involves a relatively a simple and robust construction which can be produced at low-cost. As a result of the kinematics according to the disclosure achieved by the arrangement of the pendulum element in combination with the driver part and the spindle, it is furthermore achieved that the spindle has different speeds during the reciprocating motion, which enables rapid and energy-efficient saw progress.

In one particularly advantageous embodiment, the guide element in the pendulum element forms a receiver into which the driver part engages. This construction is in turn characterized by a high degree of robustness.

It can be provided in this case that the receiver forms an elongated hole, wherein the elongated hole is oriented along the longitudinal axis of the pendulum element.

The eccentric element is advantageously an eccentric disk, wherein the driver part a cylinder arranged on the eccentric element.

It is furthermore advantageous if the driver part is mounted with a ring bearing in the guide element. As a result of this, the friction between the driver part and the guide element is reduced, which in turn has an advantageous effect as a result of reduced wear of the part and smooth running.

In one preferred embodiment, a first distance of the guide element to the bearing point and a second distance of the coupling point to the bearing point are matched to one another in such a manner than the reciprocating motion of the pendulum element at the guide element has a first amplitude and at the coupling point a second amplitude, wherein an amplitude ratio of the second amplitude to the first amplitude has a value which is not equal to 1.

The amplitude ratio (R) advantageously has a value R>1, in particular a value R>1.5, particularly preferably a value R>2.

In one advantageous configuration, the bearing point in each position of the spindle has at least a distance Δ perpendicular to a longitudinal axis of the spindle, wherein the distance Δ has a fixed value greater than zero.

The axis of rotation advantageously lies perpendicular to the output shaft and the eccentric element is driven via a worm drive by the output shaft.

The spindle is preferably mounted by means of a needle bearing on the housing. As a result of this, the kinematics of the spindle motion can be influenced, in particular the motion of the spindle and ultimately the saw blade along an arc-shaped path can be controlled.

In a further embodiment, the needle bearing prevents a motion component, directed transversely to a longitudinal axis of the spindle, of the spindle relative to the housing.

A third distance between the needle bearing and the coupling point along the first axis of the spindle is advantageously selected so that the reciprocating motion of the spindle is superimposed by a tilting motion of the longitudinal axis of the spindle about the needle bearing so that an orbital motion of the tool arises at the tip of the tool. The orbital motion brings about a rapid and highly efficient sawing process with high cutting power.

An eccentric counterweight for compensation of an imbalance of the eccentric element is advantageously arranged on the driver part. As a result of this, the hand-held machine tool operates in a particularly low-friction manner.

A further subject matter of the disclosure is a motion converter for converting a rotational motion of an output shaft of a drive motor into a reciprocating motion of a spindle relative to a housing of a hand-held machine tool, in particular a saber saw. In this case, the motion converter comprises an eccentric element driven by the output shaft rotationally about an axis of rotation with a driver part arranged eccentrically to the axis of rotation, and a pendulum element with a first end mounted pivotably at a bearing point inside the housing and a coupling point connected to the spindle. It is provided in this case that the pendulum element has a guide element for guiding the driver part; wherein the guide element is arranged between the bearing point and the coupling point.

The bearing point and the coupling point advantageously define a first axis of the pendulum element; wherein the guide element allows a motion component, directed along the first axis of the pendulum element, of the driver part relative to the pendulum element and largely prevents a motion component, directed perpendicular to the first axis of the pendulum element, of the driver part relative to the pendulum element.

The motion converter according to the disclosure can be used in a plurality of machines in which a rotational motion is supposed to be converted into a lifting motion.

It has been shown to be advantageous that the hand-held machine tool is a cabled hand-held machine tool fitted with an electric drive motor or a wireless hand-held machine tool fitted with a battery-operated, electric drive motor or a combustion drive motor.

Further features, possible applications and advantages of the disclosure will become apparent from the following description of the exemplary embodiments of the disclosure which are represented in the drawing. It should be noted that the features described or represented in the figures on their own or in any desired combination only have a descriptive character for the subject matter of the disclosure, independently of their summary in the disclosure or their reference back as well as independently of their formulation or representation in the description or in the drawing and are not intended to restrict the disclosure in any form.

BRIEF DESCRIPTION OF THE DRAWINGS

The disclosure will be explained in greater detail below on the basis of exemplary embodiments represented in the drawings. In the drawings:

FIG. 8 shows a schematic representation of a speed profile of a tip of a tool mounted on a hand-held machine tool according to the disclosure.

DETAILED DESCRIPTION

Figure 1:
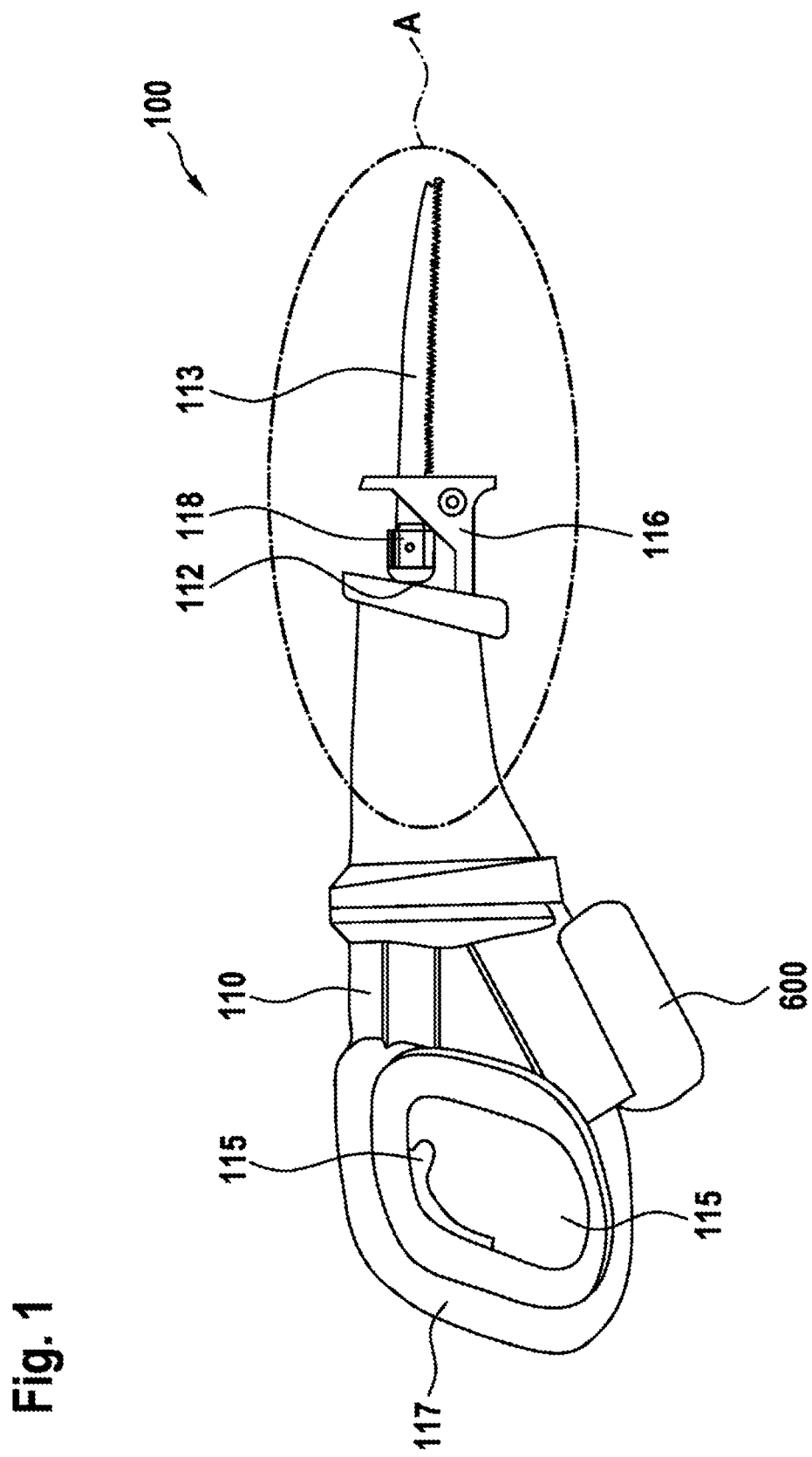
FIG. 1 shows a schematic side view of a hand-held machine tool according to the disclosure with a motion converter according to the disclosure.
Figure 2:
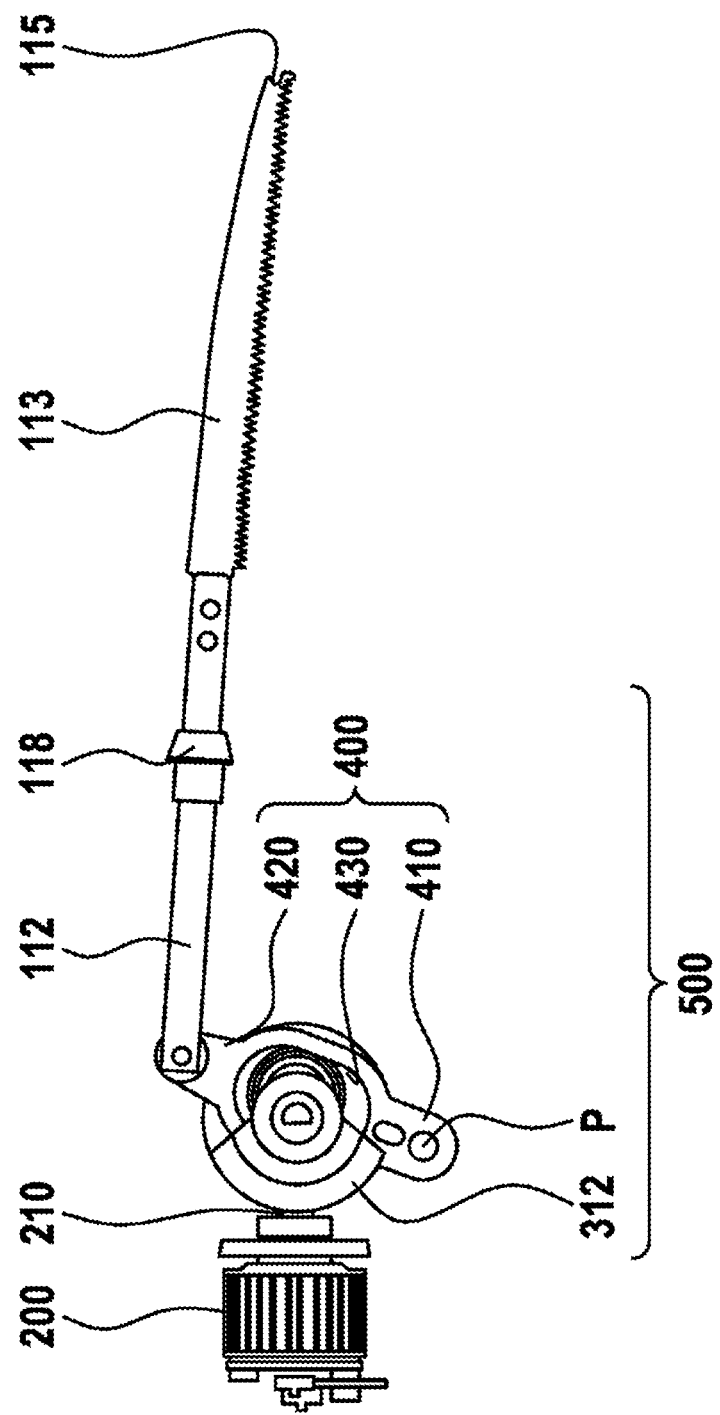
FIG. 2 shows a schematic side view of the motion converter from FIG. 1 in portion A.

FIG. 1 represents a side view of a battery-operated hand-held machine tool 100 according to the disclosure which is formed by way of example as saber saw 100. FIG. 2 shows some of the components arranged inside a housing 110 of the hand-held machine tool.

These components include, among other things, an electric drive motor 200 with output shaft 210 as well as a spindle 112 mounted at least partially in housing 110 for receiving a tool 114. Spindle 112 projects in the embodiment shown in the region of a workpiece stop 116 out of housing 112.

Moreover, a motion converter 500 for converting a rotational motion of output shaft 210 into a reciprocating motion of spindle 112 relative to housing 110 is arranged inside hand-held machine tool 100. Spindle 112 is thus fastened movably to housing 110 and in terms of drive is coupled to electric drive motor 200. Tool 114, which is formed, for example, as represented as a saw blade, is attached to a first end of spindle 112. Second end of spindle 112 is located in the embodiment shown in each position inside housing 110 and is connected to a pendulum element 400 described in greater detail in conjunction with FIGS. 2 to 5.

Housing 110 has a first handle 117 which has the form of a closed bracket and forms an opening 115 so that a user can better enclose handle 117 with his/her fingers. Housing 110 furthermore has a battery pack 600 and in the upper region of handle 117 an operating element 119 to control the drive motor.

As represented in detail in FIGS. 2 to 5, a motion converter 500 according to the disclosure has an eccentric element 300 driven by output shaft 210 rotationally about an axis of rotation 220 with a driver part 310 arranged eccentrically to axis of rotation 220.

Motion converter 500 furthermore has a pendulum element 400 with first end 410 and a second end 420. First end 410 is mounted pivotably at a bearing point P inside housing 110 and second end 420 is connected to spindle 112. In this manner, pendulum element 400 can execute a pendulum or swing motion about bearing point P. Spindle 112 is mounted by means of a needle bearing 118 at a point D shown in FIG. 6 on housing 110 so that a motion component, directed transversely to a longitudinal axis of spindle 112, of spindle 112 relative to housing 110 is prevented at this point D. The bearing point P in each position of spindle 112 at least a distance Δ>0 perpendicular to a longitudinal axis of spindle 112.

Figure 3:
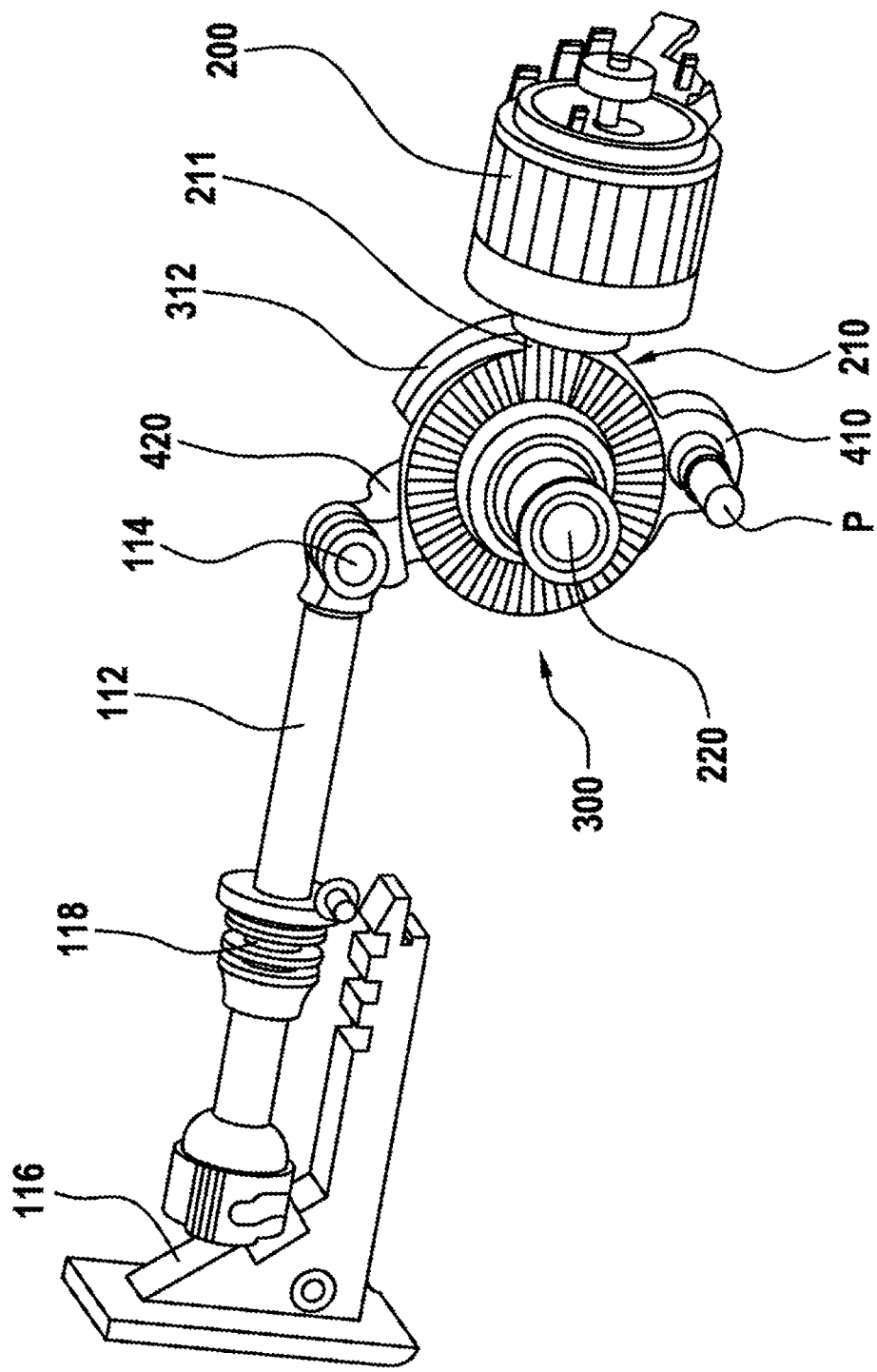
FIG. 3 shows a first schematically perspective side view of the motion converter according to the disclosure from FIG. 1 in portion A.
Figure 4:
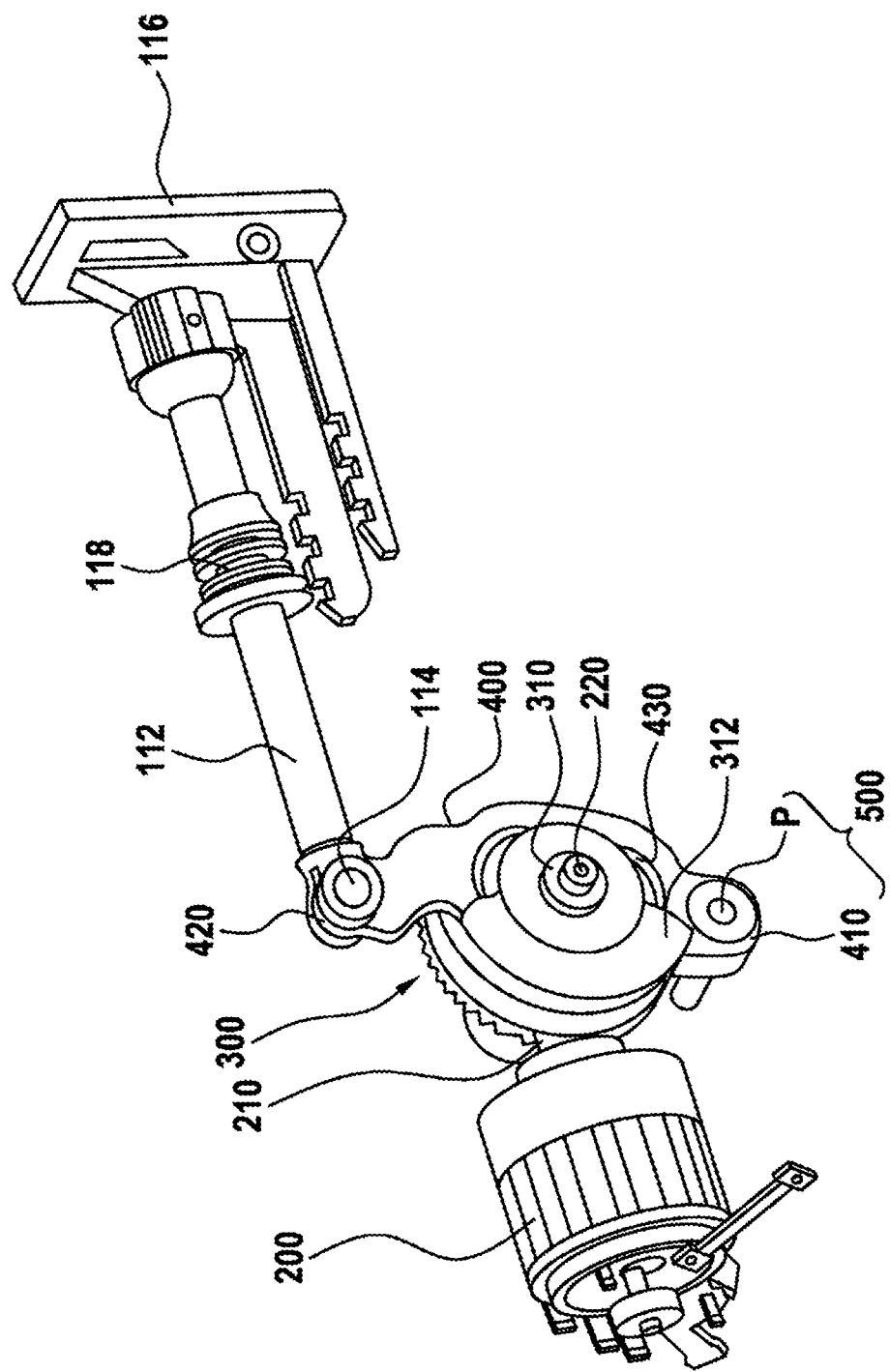
FIG. 4 shows a second schematically perspective side view of the a motion converter according to the disclosure from FIG. 1 in portion A.
Figure 5:
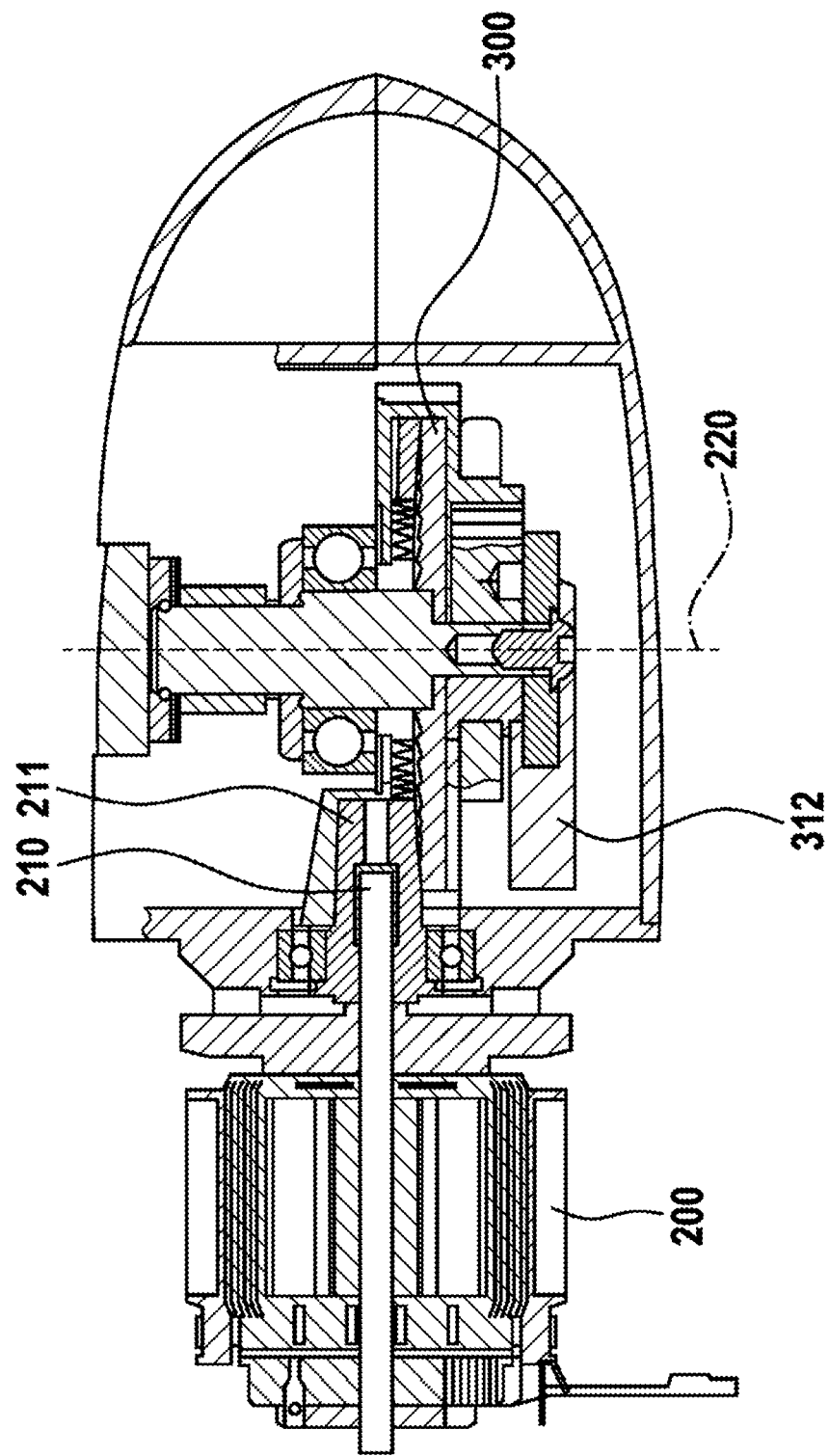
FIG. 5 shows a schematic partial cut-out of the a motion converter according to the disclosure from FIG. 1.

As is apparent in FIGS. 3 and 4, axis of rotation 220 lies in the embodiment shown perpendicular to output shaft 210. Eccentric element 300 is therefore driven in this embodiment via a worm drive by output shaft 210, wherein, in the embodiment shown, a worm gear 211 sits on the output shaft, as is shown in FIG. 5.

First end 410 and second end 420 of the pendulum element define a longitudinal axis L of pendulum element 400, wherein pendulum element 400 has a guide element 430 between first end 410 and second end 420.

Guide element 430 has, in the represented embodiment, an elliptical receiver which is in engagement with a driver part 310, arranged eccentrically to axis of rotation 220, of eccentric element 300.

Eccentric element 300 is, in the embodiment shown, an eccentric disk which bears driver part 310 formed as a cylinder. In order to reduce the friction between driver part 310 and guide element 430, a ring bearing 314 is arranged between the two components.

In order to reduce vibrations during operation, an eccentric counterweight 312 for compensation of the imbalance of eccentric element 300 is arranged on driver part 310.

Figure 6:
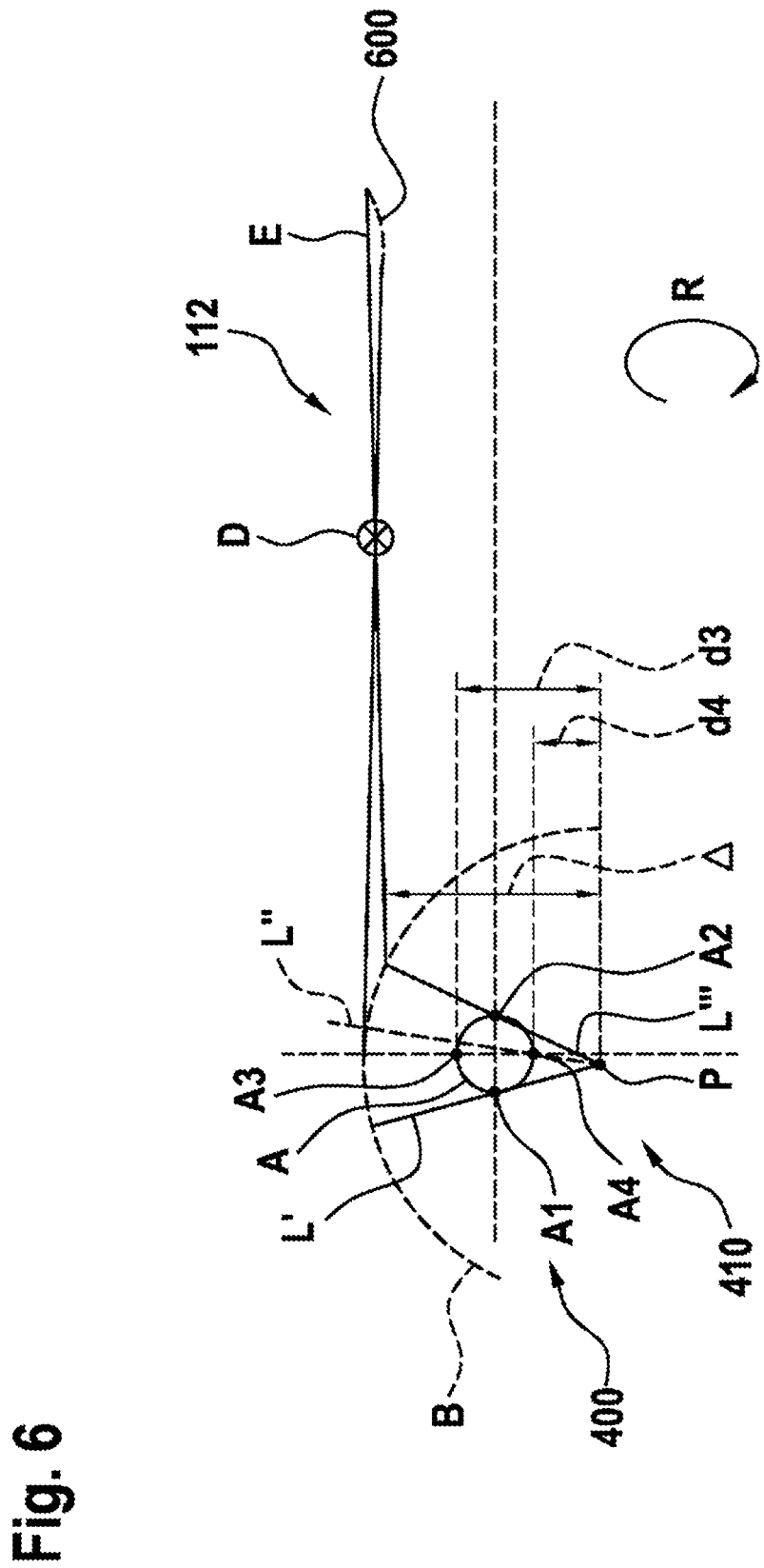
FIG. 6 shows a schematic representation of the kinematics of a motion converter according to the disclosure in a hand-held machine tool.

FIG. 6 shows a schematic representation of the kinematics of motion converter 500. Pendulum element 400 is represented by its longitudinal axis L in the various positions L', L" and L'". As a result of the mounting of first end 410 at bearing point P, representations L', L" and L'" of longitudinal axis L intersect at point P. Second end 420 of pendulum element 400 is connected to spindle 112 which in turn at point D is mounted via needle bearing 114 in the transverse direction on the housing.

The path of a center point of driver part 310 is represented in FIG. 6 by circle A. Since, in the embodiment shown, the center point of driver part 310 always lies on longitudinal axis L of pendulum element 400, a position of the center point of driver part 310 in the case of A1 corresponds to a location of the longitudinal axis in the case of L'. In FIG. 6, this is the position at which spindle 112 is maximally retracted in the housing. A position of the center point of driver part 310 in the case of A2 correspondingly corresponds to a location of the longitudinal axis in the case of L'". This is in turn the position in which spindle 112 projects maximally out of the housing. A1 and A2 correspond to the turning points of spindle 112 in their lifting motion along their longitudinal axis.

In the case of a rotation of the center point of driver part 310 along circular path A in a clockwise direction, represented by arrow R, an increase in this center point to bearing point P increases and reduces cyclically. This distance has at point A3 maximum value d3 and at point A4 minimum value d4. In the case of a constant speed of rotation of drive motor 200, this means that the pendulum motion of pendulum element 400 from location L'" to L' occurs more quickly than that from location L' to L'". This can be referred to as an asymmetrical cutting motion. The lifting motion of spindle 112 in the direction into housing 112 is correspondingly faster than the opposite direction out of housing 112. In the case of arrangement of the teeth on saw blade 114 such that they cut under tension, i.e. in the case of the motion of the spindle in the direction into the housing, this means that the cutting motion is executed with greater energy than the lifting movement out of the housing. High efficiency of the cutting process is achieved as a result.

Figure 7:
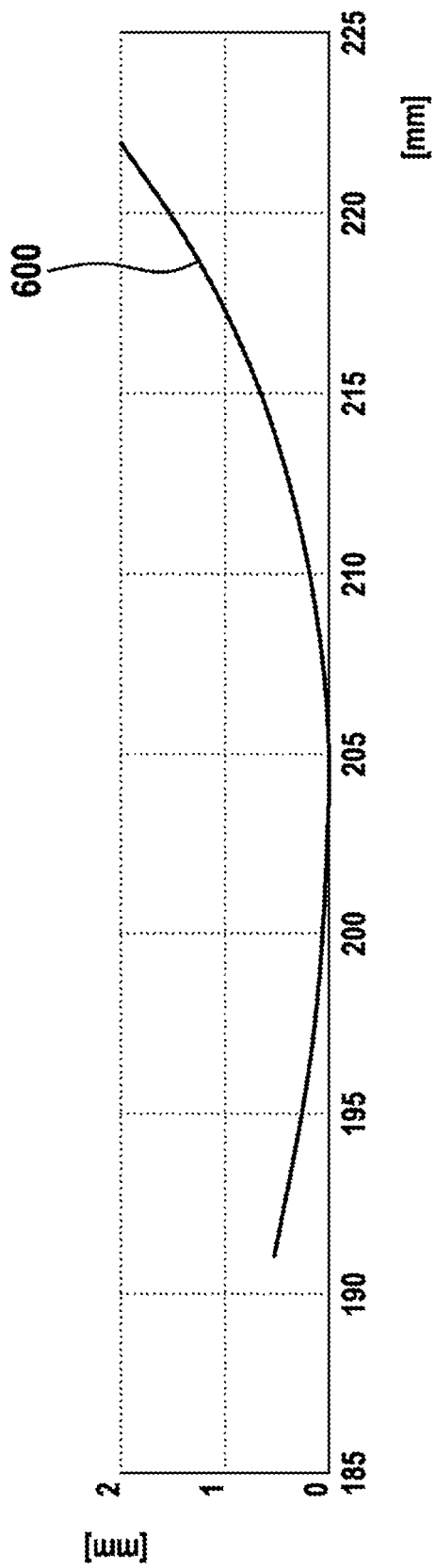
FIG. 7 shows a trajectory of a tip of a tool in conjunction with the kinematics represented in FIG. 6.

It is furthermore apparent from FIG. 6 that the kinematics according to the disclosure result in a tilting of the longitudinal axis of spindle 112 about needle-mounted point D which superimposes the lifting movement of spindle 112. This leads to a point E at the end of spindle 112 remote from pendulum element 400 executing a movement along path 600 which is represented in an enlarged form in FIG. 7. This type of motion which is transmitted to saw blade 114 can be referred to as an orbital motion and brings about a fast and highly efficient sawing process with high cutting power.

The circumstances explained on the basis of FIG. 6 are once again illustrated in FIG. 8. FIG. 8 shows a diagram which reproduces the magnitude of the path speed at point E represented in FIG. 6 over the angle covered by pendulum element 400 (as a magnitude-based sum) in the form of a curve v.

As a result of the reciprocating motion of spindle 112, curve v has a cyclical profile. Since the path speed of point E ultimately goes back to the circular motion of driver part 310 which is transmitted by a variable lever arm to pendulum element 400 and as a result to spindle 112, curve v has in portions a profile which can be referred to as approximately sinusoidal.

Points A1, A2, A3, and A4 on curve v marked in FIG. 8 correspond to the positions, represented in FIG. 6, of driver part 310 along circle A. According to the kinematics described in the context of FIG. 6, the path speed of the point E which is transmitted, for example, to a saw blade, at point A4, i.e. in the case of the maximum movement of spindle 400 directed toward the housing, is at its maximum, while it is at its minimum at points A1 and A2, i.e. the turning points of spindle 112, corresponding to positions L' and L'" of pendulum element 400. At point A3, corresponding to the maximum speed of spindle 112 directed out of the housing, curve v reaches a value which, in the present embodiment of the disclosure, lies 42% below the value reached at point A4.

It is fundamentally pointed out that the present disclosure is not restricted to a saber saw, rather in principle can also be used in different hand-held machine tools with a motion converter, in the case of which a cabled or a wireless with a battery-operated electric drive motor 200 or a drive motor 200 is arranged in a housing 110.

In addition to the described and depicted embodiments, further embodiments are conceivable which can encompass further modifications as well as combinations of features.

The invention claimed is:

1. A saber saw, comprising:
a housing;
a drive motor with an output shaft;
a spindle configured to clamp a saw blade on one end in a cantilevered manner such that the saw blade extends away from the housing and to drive the saw blade; and
a motion converter configured to convert a rotational motion of the output shaft into a reciprocating motion of the spindle, wherein:
the motion converter has an eccentric element driven by the output shaft rotationally about an axis of rotation with a driver part arranged eccentrically to the axis of rotation, and a pendulum element which is mounted pivotably about a bearing point and is connected via a coupling point to the spindle;
the pendulum element has a guide element configured to guide the driver part;
the guide element is arranged between the bearing point and the coupling point;
the bearing point and the coupling point define a first axis of the pendulum element; and
the guide element allows motion of the driver part relative to the pendulum element in a direction along the first axis of the pendulum element, and largely prevents motion of the driver part relative to the pendulum element in a direction perpendicular to the first axis of the pendulum element.

2. The saber saw as claimed in claim 1, wherein:
the guide element forms a receiver in the pendulum element into which the driver part engages.

3. The saber saw as claimed in claim 2, wherein:
the receiver is an elongated hole; and
the elongated hole is oriented substantially along the first axis of the pendulum element.

4. The saber saw as claimed in claim 1, wherein
a first distance of the guide element to the bearing point and a second distance of the coupling point to the bearing point are matched to one another in such a manner that reciprocating motion of the pendulum element at the guide element has a first amplitude and at the coupling point a second amplitude; and
an amplitude ratio (R) of the second amplitude to the first amplitude has a value which is not equal to 1.

5. The saber saw as claimed in claim 4, wherein
the amplitude ratio (R) has a value R>1.

6. The saber saw as claimed in claim 5, wherein:
the amplitude ratio (R) has a value R>1.5.

7. The saber saw as claimed in claim 6, wherein:
the amplitude ratio (R) has a value R>2.

8. The saber saw as claimed claim 1, wherein;
the bearing point, in each position of the spindle along a path of the reciprocating motion, has at least a distance ($\Delta$) perpendicular to a longitudinal axis of the spindle; and
the distance ($\Delta$) has a fixed value greater than zero.

9. The saber saw as claimed in claim 1, wherein:
the axis of rotation lies perpendicular to the output shaft; and
the eccentric element is driven via a worm drive by the output shaft.

10. The saber saw as claimed in claim 1, wherein:
the spindle is mounted using a needle bearing on the housing; and
the needle bearing prevents a motion component directed transversely to a longitudinal axis of the spindle relative to the housing.

11. The saber saw as claimed in claim 10, wherein:
a third distance between the needle bearing and the coupling point along the longitudinal axis of the spindle is selected so that the reciprocating motion of the spindle is superimposed by a tilting motion of the longitudinal axis of the spindle about the needle bearing so that an orbital motion of the saw blade arises at a tip of the saw blade.

12. The saber saw as claimed in claim 1, wherein
an eccentric counterweight configured to compensate an imbalance of the eccentric element is arranged on the driver part.

13. The saber saw as claimed in claim 1, wherein the drive motor and the motion converter are arranged in the housing, and the spindle is mounted at least partially in the housing.

14. A motion converter of a saber saw, the motion converter configured to convert a rotational motion of an output shaft of a drive motor of the saber saw into a reciprocating motion of a spindle of the saber saw, the spindle configured to clamp one end of a saw blade in a cantilevered manner such that the saw blade extends away from a housing of the saber saw, the motion converter comprising:
an eccentric element driven by the output shaft rotationally about an axis of rotation with a driver part arranged eccentrically to the axis of rotation; and
a pendulum element with a first end mounted pivotably at a bearing point and a coupling point connected to the spindle, wherein:
the pendulum element has a guide element configured to guide the driver part;
the guide element is arranged between the bearing point and the coupling point;
the bearing point and the coupling point define a first axis of the pendulum element; and
the guide element allows motion of the driver part relative to the pendulum element in a direction along the first axis of the pendulum element, and largely prevents motion of the driver part relative to the pendulum element in a direction perpendicular to the first axis of the pendulum element.

* * * * *